United States Patent
Ukai et al.

(10) Patent No.: US 12,215,987 B2
(45) Date of Patent: Feb. 4, 2025

(54) MAP DATA OUTPUT DEVICE

(71) Applicants: DENSO CORPORATION, Kariya (JP); TOYOTA JIDOSHA KABUSHIKI KAISHA, Toyota (JP)

(72) Inventors: Hiroki Ukai, Kariya (JP); Masahiro Goto, Kariya (JP); Shuichi Morimoto, Tokyo (JP); Akira Iijima, Nagoya (JP); Chika Tsumori, Funabashi (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 355 days.

(21) Appl. No.: 17/477,261

(22) Filed: Sep. 16, 2021

(65) Prior Publication Data

US 2022/0003570 A1    Jan. 6, 2022

Related U.S. Application Data

(63) Continuation of application No. PCT/JP2020/003918, filed on Feb. 3, 2020.

(30) Foreign Application Priority Data

Mar. 20, 2019    (JP) .................................. 2019-052933

(51) Int. Cl.
*B60W 30/18* (2012.01)
*B60W 60/00* (2020.01)
(Continued)

(52) U.S. Cl.
CPC ... *G01C 21/3859* (2020.08); *B60W 30/18163* (2013.01); *G01C 21/3815* (2020.08);
(Continued)

(58) Field of Classification Search
CPC ......... B60W 30/18163; B60W 60/001; B60W 2552/53; B60W 2556/50; G01C 21/3859;
(Continued)

(56) References Cited

U.S. PATENT DOCUMENTS

2018/0025632 A1*   1/2018   Breed .................. G09B 29/106
                                                         701/93
2018/0045832 A1*   2/2018   Ibrahim ............. G01C 21/1654
(Continued)

FOREIGN PATENT DOCUMENTS

JP        2011-53163 A        3/2011
JP        2017146530 A    *   8/2017
(Continued)

*Primary Examiner* — Ian Jen
*Assistant Examiner* — Hossam M El Abd Latif
(74) *Attorney, Agent, or Firm* — Maschoff Brennan

(57) ABSTRACT

A map data output device includes: a map storage that stores map data that represents lane network information; a position determination portion that determines a current position of a vehicle; a read processing portion that reads the map data of an area established based on the current position; a control map generation portion that generates control map data obtained by adding information to the map; and an output portion that outputs the control map data to a vehicle control device.

9 Claims, 4 Drawing Sheets

(51) Int. Cl.
*G01C 21/00* (2006.01)
*G05D 1/00* (2024.01)
*G08G 1/16* (2006.01)
*G09B 29/00* (2006.01)

(52) U.S. Cl.
CPC .......... *G05D 1/0274* (2013.01); *G08G 1/167* (2013.01); *G09B 29/006* (2013.01); *B60W 60/001* (2020.02); *B60W 2552/53* (2020.02); *B60W 2556/50* (2020.02)

(58) Field of Classification Search
CPC ............. G01C 21/3815; G05D 1/0274; G05D 1/0278; G05D 2201/0213; G08G 1/167; G09B 29/006
See application file for complete search history.

(56) References Cited

U.S. PATENT DOCUMENTS

| | | | |
|---|---|---|---|
| 2018/0151066 A1* | 5/2018 | Oba | G05D 1/247 |
| 2018/0238696 A1* | 8/2018 | Takeda | G01C 21/3694 |
| 2018/0345962 A1* | 12/2018 | Konishi | B60W 10/04 |
| 2019/0078896 A1* | 3/2019 | Zhu | G08G 1/0112 |

FOREIGN PATENT DOCUMENTS

| | | |
|---|---|---|
| JP | 6197393 B2 | 9/2017 |
| JP | 2019-12130 A | 1/2019 |
| JP | 2019012130 A * | 1/2019 |

* cited by examiner

MAP DATA OUTPUT DEVICE

CROSS REFERENCE TO RELATED APPLICATIONS

The present application is a continuation application of International Patent Application No. PCT/JP2020/003918 filed on Feb. 3, 2020, which designated the U.S. and claims the benefit of priority from Japanese Patent Application No. 2019-052933 filed on Mar. 20, 2019. The entire disclosures of all of the above applications are incorporated herein by reference.

TECHNICAL FIELD

The present disclosure relates to a map data output device that outputs control map data to a vehicle control device.

BACKGROUND

It has been known that a device reads map data of a peripheral of a current position from a storage and controls traveling of a vehicle by using the read map data. In an automatic driving assist system of a comparative example, the map data represents roads at a lane level. Accordingly, vehicle control at the lane level becomes possible.

SUMMARY

A map data output device includes: a map storage that stores map data that represents lane network information; a position determination portion that determines a current position of a vehicle; a read processing portion that reads the map data of an area established based on the current position; a control map generation portion that generates control map data obtained by adding information to the map; and an output portion that outputs the control map data to a vehicle control device.

BRIEF DESCRIPTION OF DRAWINGS

The above and other features, and advantages of the present disclosure will be more clearly understood from the following detailed description with reference to the accompanying drawings. In the accompanying drawings, FIG. 1 a diagram showing a configuration of a vehicle control data output device.

DETAILED DESCRIPTION

In order to enable highly accurate vehicle control, it is preferable that map data supplied to a control device that controls vehicle traveling represents the road or the road periphery in detail. However, it is necessary to control the vehicle quickly. Accordingly, it is required to read the map data from the storage quickly. In order to read the map data quickly, it is preferable that the amount of data is small. Further, a storage capacity of the storage is not infinite. In this respect as well, it is preferable that the amount of map data is small. However, the small amount of the map data means that information represented by the map data is small. When the data amount of the map data is small, it may be difficult to control the vehicle with high accuracy.

One example of the present disclosure provides a map data output device that outputs vehicle control data that enables highly accurate vehicle control while reducing the amount of map data to be stored.

According to one example embodiment, a map data output device includes: a map storage that stores map data that represents lane network information that shows a model of a lane of a road by connecting a link that indicates a part of the lane; a position determination portion configured to determine a current position of a vehicle; a read processing portion that reads, from the map storage, the map data of an area established based on the current position determined by the position determination portion; a control map generation portion that generates control map data obtained by adding information to the map data based on the map data read by the read processing portion; and an output portion that outputs the control map data to a vehicle control device configured to control behavior of the vehicle.

The control map data output to the vehicle control device is not only stored in the map storage but also obtained by adding information to the map data stored in the map storage. In other words, the information amount of the high accuracy map data stored in the map storage is smaller than the information amount of the control map data. Accordingly, the control map data is stored in the second map storage. As compared with the case of reading the control map data, the reading speed can be made faster, and the storage capacity necessary for storing the map data can be reduced.

Further, the map data stored in the map storage is map data representing the lane network information, that is, the road at the lane level. The control map data output to the vehicle control device is obtained by further adding information to the map data stored in the map storage. Accordingly, it is possible to perform highly accurate vehicle control.

Figure 1:
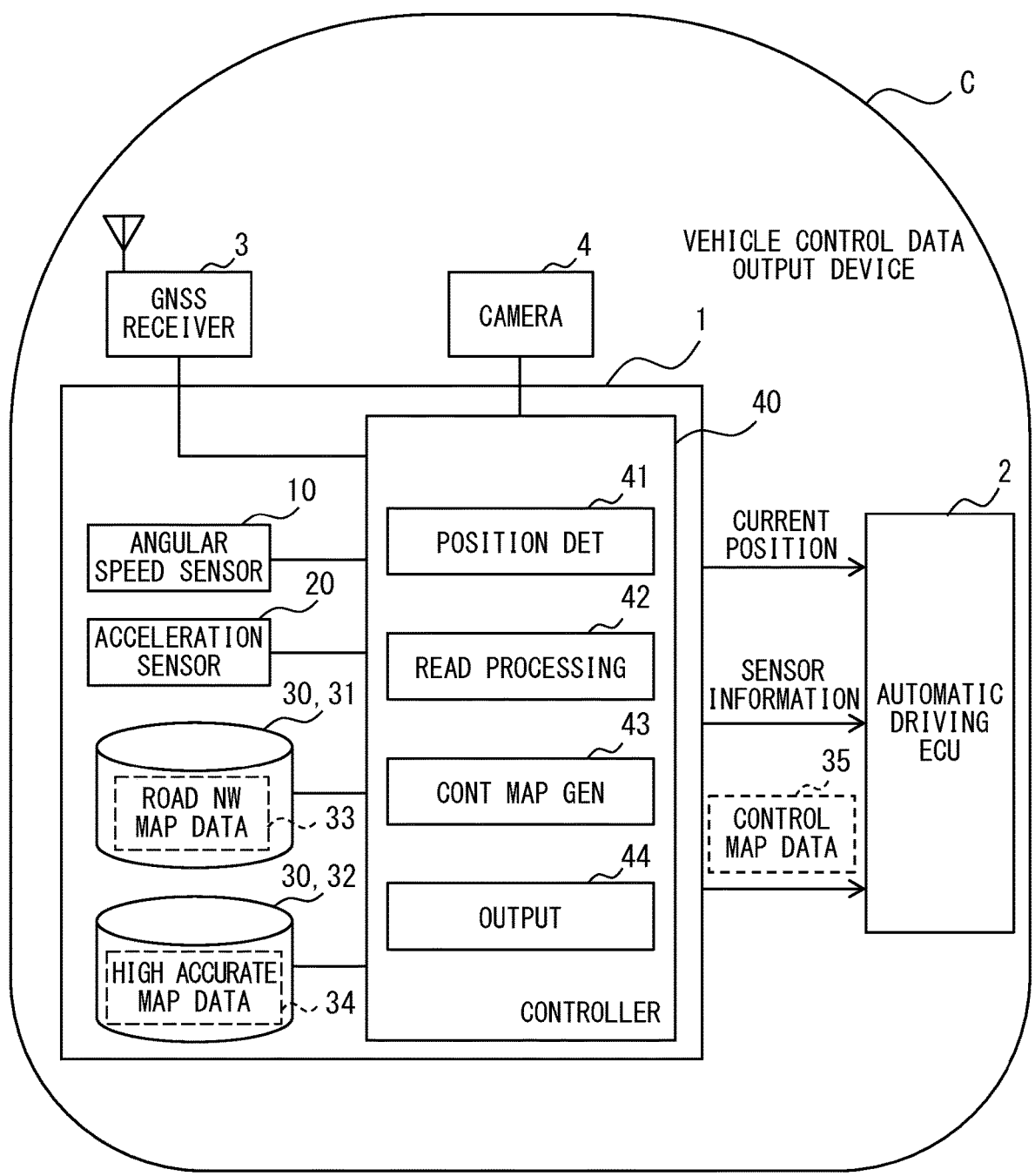

Hereinafter, an embodiment will be described with reference to the drawings. FIG. 1 is a diagram showing a configuration of a vehicle control data output device 1 having a function as a map data output device. The vehicle control data output device 1 sequentially outputs vehicle control data to an automatic driving ECU 2. The ECU is an abbreviation for Electronic Control Unit. The vehicle control data output device 1 and the automatic driving ECU 2 are mounted on a vehicle C. The vehicle C is a vehicle that travels on the road, and is equipped with a driving source such as an engine or a motor. The vehicle C is also equipped with a GNSS receiver 3, a camera 4, and the like.

The vehicle control data includes data indicating a current position and sensor information, and control map data 35. The data may mean digitized information. The automatic driving ECU 2 is a vehicle control device. The automatic driving ECU 2 acquires the vehicle control data, and controls behavior of the vehicle C by using the vehicle control data. Specifically, the content of the controlled behavior includes acceleration, deceleration, stop, start, right turn, left turn, and the like of the vehicle C. The automatic driving ECU 2 controls the behavior of the vehicle C, so that the vehicle C travels on the road without the operation of a driver. Further, the automatic driving ECU 2 may control the behavior of the vehicle C in order to assist driving operation of the driver.

The GNSS receiver 3 receives a navigation signal transmitted by a navigation satellite of a GNSS (Global Navigation Satellite System) that is a satellite navigation system. Then, the current position is sequentially calculated based on the received navigation signal. The GNSS receiver 3 outputs the calculated current position to a controller 40 of the vehicle control data output device 1. The camera 4 captures the surroundings of the vehicle C (the periphery of the vehicle C), and sequentially outputs image data indicating the captured image to the controller 40. An installation position and an angle of view of the camera 4 are adjusted so that the image captured by the camera 4 includes a road surface of the road on which the vehicle C travels, signs existing around the road, and the like.

The vehicle control data output device 1 includes an angular speed sensor 10, an acceleration sensor 20, a map storage 30, and the controller 40. The angular speed sensor 10 is a sensor that detects the angular speed, which is generated at the vehicle C, around a vertical direction axis. As the angular speed sensor 10, a yaw rate sensor can be used. The acceleration sensor 20 detects each acceleration, which is generated at the vehicle C, in a vehicle front-rear direction, a vehicle horizontal direction, and the vehicle vertical direction.

The map storage 30 includes a first map storage 31 storing road network map data 33 and a second map storage 32 storing high accuracy map data 34. Each of the first map storage 31 and the second map storage 32 is a non-volatile storage.

The road network map is a map that represents an actual road on which the vehicle C travels by nodes. road links, and the like. The node is a node when each road such as intersection is represented by a line. The road link represents a road section between the nodes. The road link represents a road section in units of roads than lanes.

While the road network map represents a road map by road links that are links in units of roads, the high accuracy map is a map that represents a road map by lane links 342 (see FIG. 4) that are links of a lane, that is, a vehicle lane.

The lane links 342 models and shows a part of the lane of the road. As one attribute of the lane link 342 representing continuous parts in the actual road, information indicating a mutual connection relation is added. Thereby, the connection relation of the lanes in a longitudinal direction of the road is expressed. When one road is connected to a different road, the connection relation of lanes each located in different roads is added as the attribute of the lane link 342. That is, the information (hereinafter, lane link information) added to the lane link 342 includes lane network information indicating the network of the lane. Further, the high accuracy map data 34 including the lane link information is data representing the lane network information.

The attributes of the lane link 342 include, in addition to the connection relation of the lane link 342, lane shape information that is information for specifying the shape of lane. The lane shape information includes shape points 343 (see FIG. 5) indicating a position where the lane exists, and a lane shape attribute which is an attribute that is different from the position where the lane exists and specifies the lane shape. The shape points 343 are located at both endpoints of the lane link 342 and multiple points between the endpoints, and indicate the center of the lane in a road width direction. The shape points 343 are indicated by coordinates expressed by latitude and longitude. The lane shape attributes include lane gradient, curvature, width value, and the like.

The reason why the high accuracy map data 34 includes the lane network information is that the automatic driving ECU 2 can control the vehicle with high accuracy. However, when the actual road is expressed in too much detail, the data amount of the high accuracy map data 34 (in other words, information amount) becomes too large, and a decrease in a data reading speed occurs. Therefore, the high accuracy map data 34 of the present embodiment has a small amount of information in consideration of the reading speed. Further, in order to make up for the insufficient amount of information, the controller 40 performs interpolation of data based on the high accuracy map data 34.

The controller 40 can be implemented by a computer including a CPU, a ROM, a RAM, an I/O, a bus line connecting those components, and the like. The ROM stores a program for causing a general-purpose computer to function as the controller 40. The CPU executes the program stored in the ROM while using a temporary storage function of the RAM, so that the controller 40 functions as a position determination portion 41, a read processing portion 42, a control map generation portion 43, and an output portion 44. In the drawings, the position determination portion 41 may be also referred to as POSITION DET, the read processing portion 42 may be also referred to as READ PROCESSING, the control map generation portion 43 may be also referred to as CONT MAP GEN, and the output portion 44 may be also referred to as OUTPUT. The execution of these functions means that a method corresponding to the program is executed.

The position determination portion 41 periodically determines the current position of the vehicle C. The current position determined by the position determination portion 41 is accurate enough not only to specify the road on which the vehicle C is traveling but also to specify the lane on which the vehicle C is traveling.

Figure 2:
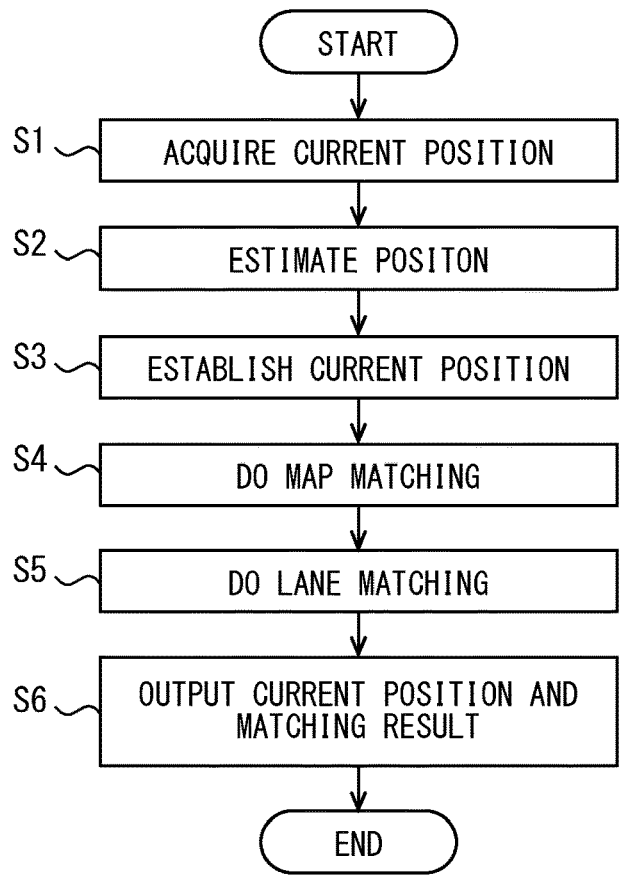
FIG. 2 is a flowchart showing processes executed by a position determination portion of FIG. 1.

FIG. 2 is a flowchart showing processes executed by the position determination portion 41. The processes executed by the position determination portion 41 will be described with reference to FIG. 2. The position determination portion 41 executes the processes shown in FIG. 2 at a constant cycle. The constant cycle is determined based on a cycle at which the automatic driving ECU 2 requests the update of the current position. The cycle at which the automatic driving ECU 2 requests the update of the current position is, for example, 100 ms (milliseconds).

In S1, the current position is acquired from the GNSS receiver 3. In S2, the position estimation is performed based on a relative locus. The relative locus is a movement locus of the vehicle C. In the movement locus, the origin is a position for determining (establishing) the current position at the last time. The relative locus is generated based on sensor values from the angular speed sensor 10 and the acceleration sensor 20. The relative locus may be generated based on a sensor value from a vehicle wheel speed sensor or a vehicle speed sensor.

In S3, the current position is established by a composite navigation method. The composite navigation method is a method of determining the current position by using the current position by the GNSS and a position estimated from the relative locus in a combination manner. In the composite navigation method, for example, based on an accuracy of each of the current position by the GNSS and the position estimated from the relative locus, the acceptance or rejection of these positions is determined. Further, based on each accuracy, a weighting coefficient of each position is determined. Based on the weighting coefficient, one of the current position by the GNSS and the position estimated from the relative locus is corrected in consideration of the other position to establish the current position.

In S4, map matching is performed. A map used in this S4 is the road network map. A road link where the vehicle C exists, a position of the vehicle C on the road link, and an advancing azimuth of the vehicle C are determined by matching the road network map with the relative locus whose end point is the current position established in S3.

In S5, lane matching is performed. A map used in this S5 is the high accuracy map. A lane where the vehicle C is traveling is determined by matching the high accuracy map with the relative locus whose end point is the current position established in S3.

In S6, the current position established in S3 and the matching results obtained by execution of the processes in S4 and S5 are output to the automatic driving ECU 2. Together with the information or at a different predetermined timing, the sensor information such as the angular speed or the acceleration is output to the automatic driving ECU 2.

Return to the description of FIG. 1. The read processing portion 42 reads the high accuracy map data 34 of an area determined based on the current position determined by the current position determination portion 41 from the second map storage 32. The read area can be set to the road within a certain distance along the road with respect to the current position and the periphery of the road. In another example of the read area, when route guidance is performed, a road provided as a guidance route has a distance longer than a road that is not the guidance route. Therefore, it is possible to read the road and the peripheral area by the longer distance. The read cycle may be set to a cycle longer than the current position update cycle. For example, while the current position update cycle is set to 100 ms, the read current can be set to 2000 ms.

The control map generation portion 43 generates the control map data 35 obtained by adding the information to the high accuracy map data 34 based on the high accuracy map data 34 read by the read processing portion 42. That is, the information amount of the control map data 35 is larger than the information amount of the high accuracy map data 34. The control map generation portion 43 further adds the lane network information to the high accuracy map data 34. Further, the control map generation portion 43 adds the lane shape information to the high accuracy map data 34.

Figure 3:
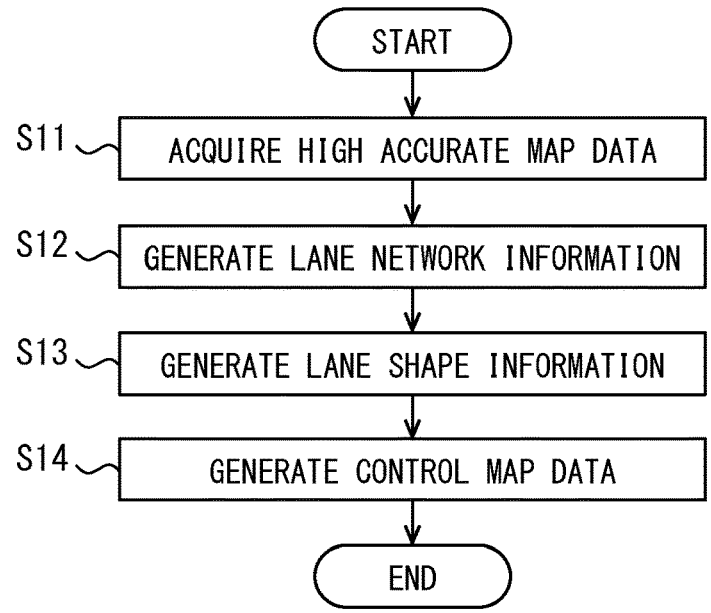
FIG. 3 is a flowchart showing processes executed by a control map generation portion of FIG. 1.

The processes executed by the control map generation portion 43 will be described with reference to FIG. 3. The processes shown in FIG. 3 is executed every time the read processing portion 42 reads the high accuracy map data 34. In S11, the high accuracy map data 34 read by the read processing portion 42 is acquired. The high accuracy map data 34 acquired in S11 is set to original data for generating the control map data 35.

In S12, the lane network information to be added to the acquired high accuracy map data 34 is generated. The added lane network information is a connection relation of a lane that is not represented by the high accuracy map data 34 acquired in S11.

Figure 4:
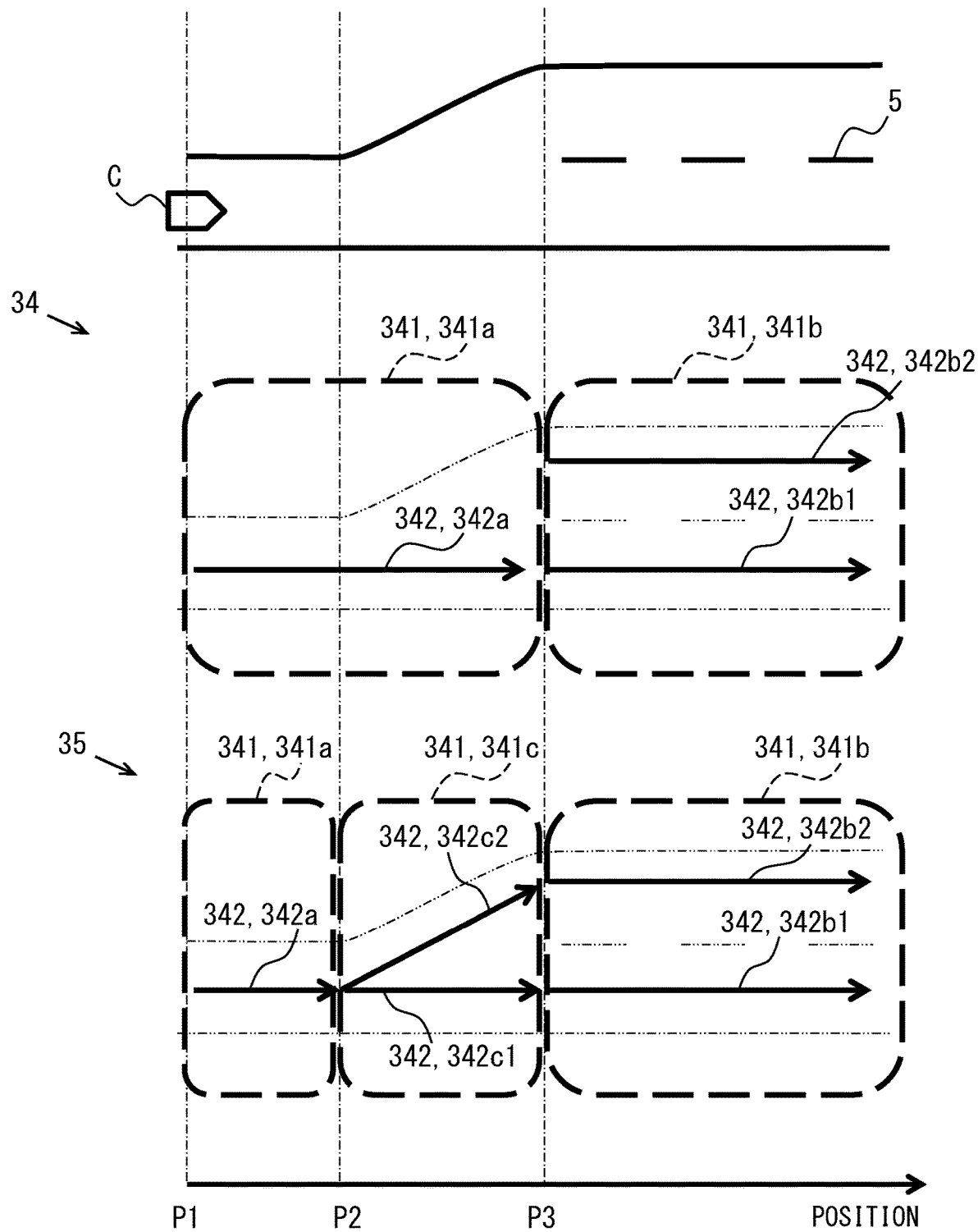
FIG. 4 is a diagram for specifically describing high accuracy map data and control map data.

A specific example of the lane network information to be generated will be described with reference to FIG. 4. The upper part of FIG. 4 schematically shows the actual road. At a position P1 where the vehicle C is traveling, the road has one lane. When the vehicle C travels from the position P1, the width increases from a position P2 and the number of lanes becomes two from a position P3.

The middle part of FIG. 4 is the high accuracy map data 34 corresponding to the actual road shown in the upper part of FIG. 4. In the middle part of FIG. 4, it is shown that the actual road overlaps with a long dashed double-dotted line. In the high accuracy map data 34, the roads are described separately in lane blocks 341. The lane blocks 341 are obtained by dividing the road into multiple blocks so that multiple lane blocks 341 exist in the longitudinal direction of the road, and include at least one lane link 342. The high accuracy map data 34 stores the lane link information in units of lane block 341. The information stored in association with the lane block 341 includes, in addition to lane link information about the lane link 342 in the lane block 341, the number of lanes in the lane block 341.

The lane link information includes an ID of the lane link 342. Further, the lane link information includes an ID of a different lane link 342 connected to the lane link 342. In addition, the lane link information includes laneless information indicating whether the lane link 342 includes a laneless section. The laneless section means a section in which the number of lanes is not specified. The laneless section does not mean a section in which there is no lane marking. Although, in one-lane road section, there is no lane marking, the number of lanes is one. Therefore, the one-lane road section is not the laneless section.

When the number of lanes changes from one to two, there is a high possibility that the width increases. A section of which width increases may be the laneless section. In FIG. 4, a section from the position P2 to the position P3 is the laneless section. Accordingly, in the high accuracy map data 34 shown in the middle part of FIG. 4, the lane link information about a lane link 342a in a left lane block 341a includes information indicating that there is the laneless section in the lane link 342a.

In the middle part of FIG. 4, a right lane block 341b includes two links of lane links 342b1 and 342b2. The lane link 342b2 indicates that the number of lanes becomes two from the position P3 in the road advancing direction. As described above, when the number of lanes increases through the laneless section, in the high accuracy map data 34, the connection information is not added to the end point, which is close to the laneless section, of the lane link 342 generated in accordance with the increase.

The high accuracy map data 34 includes the lane network information. In in order to reduce the data amount and increase the reading speed, as illustrated in FIG. 4, some connection relation is omitted. However, the actual road has the connection relation. Therefore, the control map generation portion 43 adds the connection relation to the lane link 342 in which the connection relation is omitted.

The lower part of FIG. 4 shows a diagram for describing the control map data 35 to which the connection relation is added. Also in the lower part of FIG. 3, the actual road is shown by overlapping with a long dashed double-dotted line. In the control map data 35, in the middle of the road, the connection relation is added to the end point of the lane link 342 of which end point having no connection relation with the different lane link 342.

In the case where the connection relation is added, when the number of lanes increases, in other words, when there is a branch of the lane, the branching lane link 342 is added to the lane block 341 in which the number of lanes is smaller. In the example shown in FIG. 4, the lane block 341a is the lane block 341 in which the number of lanes is smaller. The width of this lane block 341a increases from the position P2 to the position P3. The section where the width increases can be considered as the branching part of the lane. Therefore, a branching lane link 342 is added to this branching portion.

As shown in the upper part of FIG. 4, a broken line 5, which is a section line indicating that the lane can be changed, is marked on this road after the position P3. An attribute indicating whether the lane can be changed is added to the lane link information. The branching lane link 342 may be added on the condition that the lane link information indicating multiple lane link 342 in the lane block 341 where the number of lanes is larger includes information bilaterally indicating that the lane can be changed.

In FIG. 4, the lane block 341 in which the number of lanes is smaller is the lane block 341a. In order to add the branching lane link 342, in the control map data 35, the lane block 341a of the high accuracy map data 34 is divided, and the divided part is set to a lane block 341c. The lane block 341c is a section where the width increases as the advancing distance increases on the road. For example, in FIG. 4, the width at the position P1 is wider than the width at the point P3. The start point of the section where the width increases as the advancing distance increases can be determined based on the change in width. Further, it is possible to determine a division position based on a width value invalid flag indicating whether a width value is valid. The number of width value invalid flags is plural, and the width invalid flags are flags provided for one lane link 342 in the longitudinal direction of the lane and included in the lane link information. By using the width value invalid flag, the lane block 341 may be divided at a position where the width value is changed from valid to invalid or a position where the width value is changed from invalid to valid.

After the division of the lane block 341, a lane link 342c2 is added to the lane block 341c closer to the lane block 341b where the number of lanes is larger. With the addition of the lane link 342c2, the lane block 341c has two lane links 342 of the lane link 342c1 and the lane link 342c2. That is, the number of lanes in the lane block 341c becomes equal to the number of lanes in the lane block 341b.

Further, the lane link 342 existing in the lane block 341 generated by the division is provided with the connection relation with the lane links 342 in the lane block 341 that are continuous in the front-rear direction (for example, direction from the position P1 to P3). That is, the connection relations with the lane link 342a and the lane link 342b1 are added to the lane link 342c1, and the connection relations with the lane link 342a and the lane link 342b2 are added to the lane link 342c2.

The example of FIG. 4 is an example in a case where the lane is branched. However, also in a case where the lanes are merged, the lane link 342 is added in the similar manner. The part where the lane link 342 is added is a part where the width decreases. This is because the part where the width decreases can be considered as a merging part. The merging part and the branching part described above are specific forms of a branching-merging part.

In the actual road, in both cases of the case where the lane is branched and thereby the number of lanes increases and the case where the lanes are merged and thereby the number of lanes decreases, there is the connection relation with a different lane in the longitudinal direction of the road. Accordingly, it is possible to high accurately control the vehicle according to the actual road by adding the lane link 342 when the lane is branched and when the lanes are merged, as described above.

Figure 5:
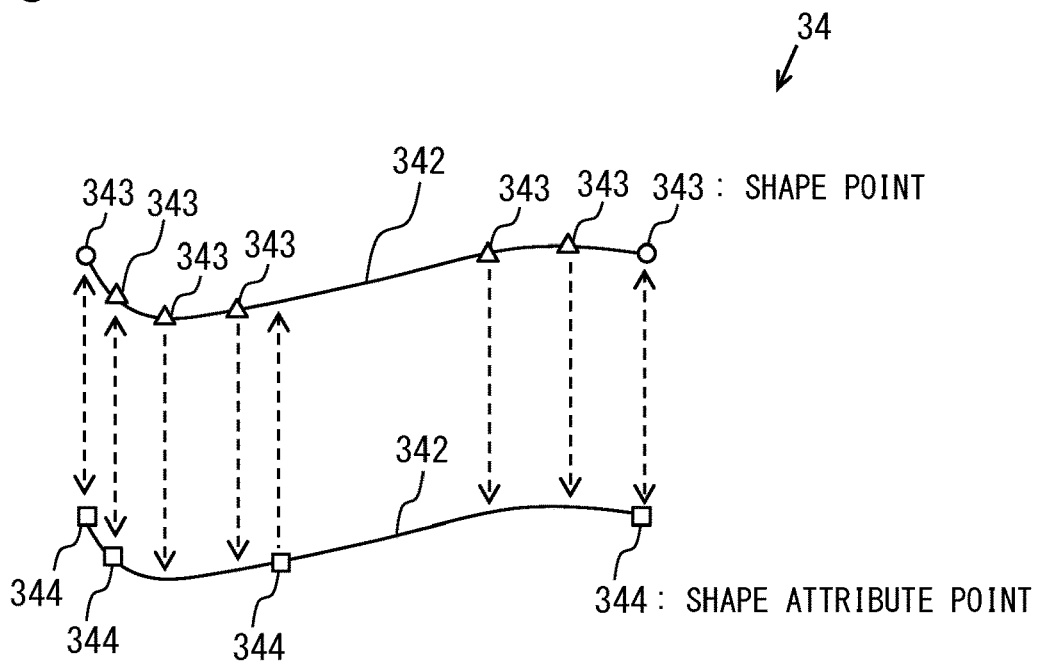
FIG. 5 is a diagram showing lane shape information in the high accuracy map data.

In S13 of FIG. 3, the lane shape information to be added to the acquired high accuracy map data 34 is generated. A specific example of the generated lane shape information will be described with FIG. 5. FIG. 5 conceptually shows the lane shape information before the addition, that is, the lane shape information in the high accuracy map data 34. The upper part of FIG. 5 shows shape points 343, and the lower part shows shape attribute points 344. In FIG. 5, the shape points 343 at the both ends are shown by circles, and the shape points 343 between the both ends are shown by triangles. The shape attribute points 344 are positions where the shape attributes of the lane link 342 are shown. The lane link information includes multiple types of attributes, and the shape attribute point 344 is provided for each of the types of attributes.

In the high accuracy map data 34, the shape point 343 is placed at a point where the curvature of the lane shape changes. On the other hand, the shape attribute point 344 is placed at an attribute change position or a position where a change tendency of the attribute changes. Accordingly, the position where the shape point 343 is placed does not always match the position where the attribute change point is placed. In the example of FIG. 5, each of two shape points 343 on the left and the shape point 343 on the far right has the corresponding shape attribute point 344. However, the shape attribute point 344 is not placed at the positions where the other shape points 343 are arranged. The position of the shape attribute point 344 is indicated by the moved distance on the lane link 342 from the end point of the lane link 342. That is, the shape attribute point 344 is indicated by a relative position with respect to the end point of the lane link 342.

In FIG. 5, when the position of the shape point 343 and the position of the shape attribute point 344 are same, the positions are indicated by a double-headed arrow. A position where one of the shape point 343 and the shape attribute point 344 is placed is indicated by a one-way arrow.

Figure 6:
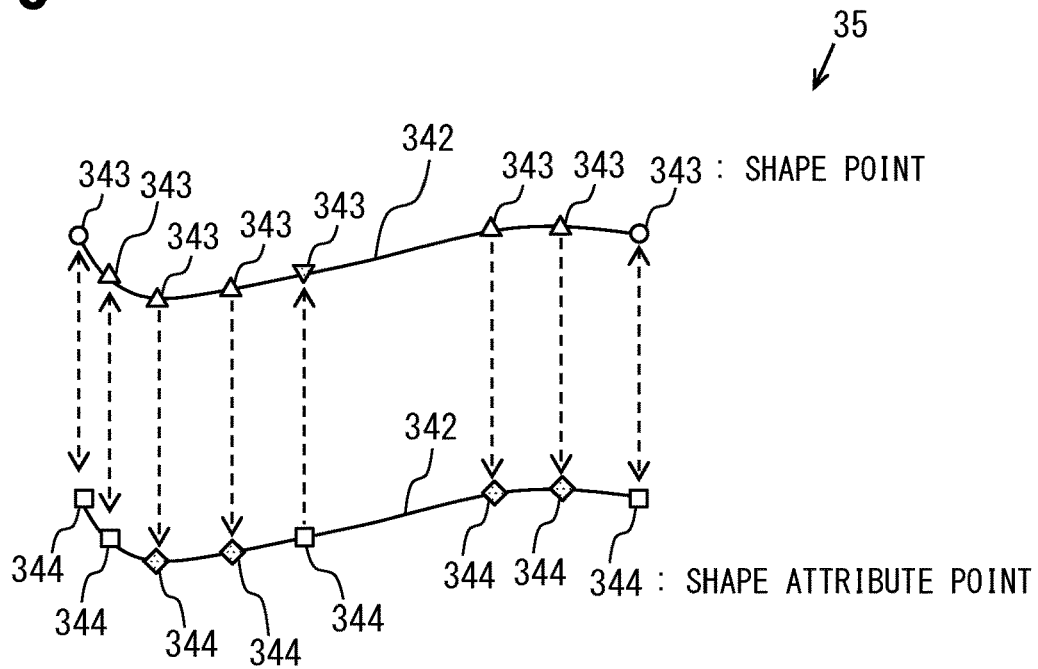
FIG. 6 is a diagram showing lane shape information in the control map data.

The control map generation portion 43 generates the shape point 343 or the shape attribute point 344 at a position indicated by the one-way arrow shown in FIG. 5. FIG. 6 shows the control map data 35 generated by the control map generation portion 43. In the control map data 35, all the shape points 343 and the shape attribute points 344 correspond to each other. Further, not only the shape points 343 and the shape attribute points 344 correspond to each other but also the correspondence relation with the shape attribute point 344 is provided to each of the shape points 343.

In FIG. 6, the shape point 343 indicated by a downward triangle is the shape point 343 generated by the control map generation portion 43. Further, the shape attribute point 344 shown by the rhombus is the shape attribute point 344 generated by the control map generation portion 43.

A method in which the control map generation portion 43 generates the shape point 343 will be described. As described above, the position where the shape attribute point 344 is placed is shown by the relative position with respect to the end point of the lane link 342. At a position obtained by movement by the relative distance from the coordinate of the end point of the lane link 342 to the above-described relative position, a new shape point 343 is generated.

A value of the lane shape attribute at the newly generated shape attribute point 344 is generated by interpolating a value of the lane shape attribute of the shape attribute point 344 placed before and after the position of the newly generated shape attribute point 344. That is, the value of the lane shape attribute at the newly generated shape attribute point 344 is calculated by a proportional calculation, according to a distance to the newly generated shape attribute point 344, of the value of the lane shape attribute of the shape attribute point 344 placed on the front side and the rear side with respect to the position of the newly generated shape attribute point 344.

In S14, the lane network information generated in S12 and the lane shape information generated in S13 are added to the high accuracy map data 34 acquired in S11 to obtain the control map data 35.

Return to the description of FIG. 1. The output portion 44 outputs the vehicle control data to the automatic driving ECU 2. The vehicle control data includes data indicating each of the current position and the sensor information. Further, the vehicle control data includes the control map data 35. The current position is acquired from the position determination portion 41. The sensor information acquired from the angular speed sensor 10, the acceleration sensor 20, and the like. The control map data 35 is generated by the control map generation portion 43.

It is not necessary to output, at the same time, the data indicating the current position, the data indicating the sensor information, and the control map data 35. For example, an output cycle of the control map data 35 can be set to be longer than an output cycle of different vehicle control data.

Overview of Embodiment

The vehicle control data output device 1 of the present embodiment described above does not store the control map data 35 to be output to the automatic driving ECU 2 in the map storage 30. The control map data 35 is data obtained by adding information to the high accuracy map data 34 stored in the second map storage 32. In other words, the information amount of the high accuracy map data 34 stored in the second map storage 32 is smaller than the information amount of the control map data 35. Accordingly, the control map data 35 is stored in the second map storage 32. As compared with the case of reading the control map data 35, the reading speed can be made faster, and the storage capacity necessary for storing the map data can be reduced.

Further, the high accuracy map data 34 stored in the second map storage 32 is the map data representing the lane network information, that is, the road at the lane level. Since the control map data 35 is obtained by adding the information to the high accuracy map data 34, the automatic driving ECU 2 enables the highly accurate vehicle control.

The controller 40 and the method described in the present disclosure may be implemented by a special purpose computer configuring a processor programmed to perform one or more functions embodied by a computer program. Alternatively, the controller 40 and the method described in the present disclosure may be implemented by a dedicated hardware logic circuit. Alternatively, the controller 40 and the method described in the present disclosure may be implemented by one or more dedicated computers configured by a combination of a processor executing a computer program and one or more hardware logic circuits. Hardware logic circuits are, for example, ASICs and FPGAs.

The storage medium for the computer program is not limited to ROM, but can be stored in a computer-readable, non-transitory tangible storage medium as instructions to be executed by a computer. For example, the program may be stored in the flash memory.

The controller and the method described in the present disclosure may be implemented by one or more dedicated computers having a processor programmed to execute one or more functions embodied by a computer program and a memory. Alternatively, the controller and the method described in the present disclosure may be implemented by one or more dedicated computers provided by configuring a processor with one or more dedicated hardware logic circuits. Alternatively, the controller and the method described in the present disclosure may be implemented by one or more dedicated computers configured as a combination of a processor and a memory programmed to execute one or more functions, and a processor configured with one or more hardware logic circuits. The computer program may be stored, as instructions to be executed by a computer, in a non-transitory tangible computer-readable storage medium.

It is noted that a flowchart or the process of the flowchart in the present disclosure includes multiple steps (also referred to as sections), each of which is represented, for instance, as S1. Further, each step can be divided into several sub-steps while several steps can be combined into a single step.

In the above, the embodiments, the configurations, the aspects of the map data output device according to the present disclosure are exemplified. The present disclosure is not limited to the above-described embodiments, each configuration and each aspect related to the present disclosure. For example, embodiments, configurations, and examples obtained from an appropriate combination of technical elements disclosed in different embodiments, configurations, and examples are also included within the scope of the embodiments, configurations, and examples of the present disclosure.

The invention claimed is:

1. A map data output device comprising:
a map storage configured to store map data that represents lane network information that shows a model of a lane of a road by connecting a link that indicates a part of the lane;
a position determination portion configured to determine a current position of a vehicle;
a read processing portion configured to read, from the map storage, the map data of an area established based on the current position determined by the position determination portion;
a control map generation portion configured to generate control map data by adding information indicating lane shape information to the map data based on the map data read by the read processing portion; and
an output portion configured to output the control map data to a vehicle control device configured to control behavior of the vehicle, wherein:
the added information is the lane shape information and is defined as addition information;
the map data represents lane shape information that indicates a shape of a lane for each link and is different from the addition information; and
the control map generation portion is configured to generate the control map data obtained by adding the addition information to increase an information amount of the lane shape information in the read map data.

2. The map data output device according to claim 1, wherein:
the control map generation portion is configured to generate the control map data obtained by increasing an information amount of the lane network information in read map data.

3. The map data output device according to claim 1, wherein:
the lane network information shown by the map data is divided into a plurality of lane blocks in a longitudinal direction of the road;

at least one lane block among the plurality of lane blocks has, as information, a lane number of the at least one lane block; and when the at least one lane block includes a branching-merging part that is at least one of a branching part or a merging part, the control map generation portion divides the at least one lane block into the branching-merging part and a different part and increases a numerical number of the branching-merging part, wherein by increase in the numerical number of the branching-merging part, the lane number of the branching-merging part is equal to a lane number added to, as the information, to a lane block adjacent to the branching-merging part.

4. The map data output device according to claim 1, wherein:

the lane shape information includes
   a shape point that is placed at a position where a shape of the lane changes and indicates a position where the lane exists by a coordinate, and
   a shape attribute point which is placed at a position where a lane shape attribute changes, of which position is specified based on a distance on the link, and which represents the lane shape attribute at the position; and the control map generation portion is configured to
   generate a corresponding shape attribute point for a shape point having no corresponding shape attribute point by interpolation of the shape attribute point in the lane shape information of the map data read from the map storage, and
   generate a corresponding shape point for a shape attribute point having no corresponding shape point based on a coordinate of an end point of the link in the lane shape information of the map data read from the map storage and a distance from the end point of the shape attribute point.

5. The map data output device according to claim 3, wherein:

the plurality of lane blocks include a first lane block and a second lane block adjacent to the first lane block;
a lane number of the first lane block is less than a lane number of the second lane block; and
the first lane block includes the branching-merging part.

6. The map data output device according to claim 4, wherein:

the lane shape attribute is an attribute that is different from the position where the lane exists, and specifies the shape of the lane.

7. A map data output device comprising:
one or more processors; and
a memory that is configured to store map data that represents lane network information that shows a model of a lane of a road by connecting a link that indicates a part of the lane, and is coupled to the one or more processors and storing program instructions that when executed by the one or more processors cause the one or more processors to at least:
determine a current position of a vehicle;
read, from the memory, the map data of an area established based on a determined current position;
generate control map data by adding information indicating lane shape information to the map data based on read map data; and
output the control map data to a vehicle control device configured to control behavior of the vehicle, wherein:

the added information is the lane shape information and is defined as addition information;
the map data represents lane shape information that indicates a shape of a lane for each link and is different from the addition information; and
the program instructions cause the one or more processors to generate the control map data obtained by adding the addition information to increase an information amount of the lane shape information in the read map data.

8. A map data output device comprising:
a map storage configured to store map data that represents lane network information that shows a model of a lane of a road by connecting a link that indicates a part of the lane;
a position determination portion configured to determine a current position of a vehicle;
a read processing portion configured to read, from the map storage, the map data of an area established based on the current position determined by the position determination portion;
a control map generation portion configured to generate control map data by adding information indicating lane shape information to the map data based on the map data read by the read processing portion; and
an output portion configured to output the control map data to a vehicle control device configured to control behavior of the vehicle, wherein:
disconnected links of the lane in the map data are connected by adding the information indicating lane shape information to the map data.

9. A map data output device comprising:
one or more processors; and
a memory that is configured to store map data that represents lane network information that shows a model of a lane of a road by connecting a link that indicates a part of the lane, and is coupled to the one or more processors and storing program instructions that when executed by the one or more processors cause the one or more processors to at least:
determine a current position of a vehicle;
read, from the memory, the map data of an area established based on a determined current position;
generate control map data by adding information indicating lane shape information to the map data based on read map data; and
output the control map data to a vehicle control device configured to control behavior of the vehicle, wherein:
disconnected links of the lane in the map data are connected by adding the information indicating lane shape information to the map data.

* * * * *